United States Patent [19]

Parodi et al.

[11] Patent Number: 5,618,771
[45] Date of Patent: *Apr. 8, 1997

[54] COMPONENTS AND CATALYSTS FOR THE POLYMERIZATION OF OLEFINS

[75] Inventors: Sandro Parodi; Roberto Nocci, both of Novara; Umberto Giannini, Milan; Pier Camillo Barbé ; Umberto Scatá , both of Ferrara, all of Italy

[73] Assignee: Montell Technology Company B.V., Netherlands

[*] Notice: The term of this patent shall not extend beyond the expiration date of Pat. No. 5,539,067.

[21] Appl. No.: 469,734

[22] Filed: Jun. 6, 1995

Related U.S. Application Data

[63] Continuation of Ser. No. 315,670, Sep. 30, 1994, abandoned, which is a continuation of Ser. No. 214,087, Mar. 16, 1994, abandoned, which is a continuation of Ser. No. 73,246, Jun. 4, 1993, abandoned, which is a continuation of Ser. No. 815,873, Jan. 3, 1992, abandoned, which is a continuation of Ser. No. 698,344, May 7, 1991, abandoned, which is a continuation of Ser. No. 584,387, Sep. 14, 1990, abandoned, which is a continuation of Ser. No. 455,809, Dec. 26, 1989, abandoned, which is a continuation of Ser. No. 328,779, Mar. 27, 1989, abandoned, which is a continuation of Ser. No. 157,063, Feb. 2, 1988, abandoned, which is a continuation of Ser. No. 32,994, Apr. 6, 1987, abandoned, which is a continuation of Ser. No. 885,212, Jul. 14, 1986, abandoned, which is a continuation of Ser. No. 692,196, Jan. 17, 1985, abandoned, which is a continuation of Ser. No. 292,156, Aug. 12, 1981, abandoned.

[30] Foreign Application Priority Data

Aug. 13, 1980 [IT] Italy ......................... 24141/80

[51] Int. Cl.$^6$ ........................ C08F 4/651; C08F 10/06
[52] U.S. Cl. ................ 502/127; 526/125.3; 526/351
[58] Field of Search ............................. 502/127

[56] References Cited

U.S. PATENT DOCUMENTS

| | | | |
|---|---|---|---|
| 4,143,223 | 3/1979 | Toyota et al. | 526/124 |
| 4,180,636 | 12/1979 | Hirota et al. | 526/125 |
| 4,187,196 | 2/1980 | Giannini et al. | 526/125 |
| 4,220,745 | 9/1980 | Tanaka et al. | 526/125 |
| 4,290,915 | 9/1981 | Toyota et al. | 526/125 |
| 4,302,566 | 11/1981 | Karol et al. | 526/125 |
| 4,331,561 | 5/1982 | Luciani et al. | 526/125 |
| 4,348,507 | 9/1982 | Ueno et al. | 526/125 |
| 4,390,671 | 6/1983 | Inai et al. | 526/125 |
| 4,393,182 | 7/1983 | Goodall et al. | 526/124 |
| 4,581,426 | 4/1986 | Asanuma et al. | 526/125 |

FOREIGN PATENT DOCUMENTS

| | | | |
|---|---|---|---|
| 55-36203 | 3/1980 | Japan . | |
| 2040967 | 9/1980 | United Kingdom | 526/125 |

Primary Examiner—Edward J. Smith

[57] ABSTRACT

Disclosed are catalysts for the polymerization of alpha-olefins which comprise the reaction product of:

(a) an Al alkyl compound;

(b) a silicon compound containing at least a Si—OR or Si—OCOR or Si—$NR_2$ bond, R being a hydrocarbyl radical;

(c) a solid comprising, as essential support, a Mg dihalide in active form and, supported thereon, a Ti halide or a halo-Ti-alcoholate and a particular, selected type of electron-donor compound.

2 Claims, No Drawings

COMPONENTS AND CATALYSTS FOR THE POLYMERIZATION OF OLEFINS

This application is a continuation of application Ser. No. 08/315,670, filed Sep. 30, 1994, (now abandoned), which is a continuation of application Ser. No. 08/214,087, filed Mar. 16, 1994, (now abandoned), which is a continuation of application Ser. No. 08/073,246, filed Jun. 4, 1993, (now abandoned), which is a continuation of application Ser. No. 07/815,873, filed Jan. 3, 1992, (now abandoned), which is a continuation of application Ser. No. 07/698,344, filed May 7, 1991, (now abandoned), which in turn is a continuation of Ser. No. 07/584,387, filed Sep. 14, 1990, (now abandoned), which in turn is a continuation of Ser. No. 07/455,809, filed Dec. 26, 1989, (now abandoned), which in turn is a continuation of Ser. No. 07/328,779, filed Mar. 27, 1989, (now abandoned), which in turn is a continuation of Ser. No. 07/157,063, filed Feb. 2, 1988, (now abandoned), which in turn is a continuation of Ser. No. 07/032,994, filed Apr. 6, 1987, (now abandoned), which in turn is a continuation of Ser. No. 06/885,212, filed Jul. 14, 1986, (now abandoned), which in turn is a continuation of Ser. No. 06/692,196, filed Jan. 17, 1985, (now abandoned), which in turn is a continuation of Ser. No. 06/292,156, filed Aug. 12, 1981, (now abandoned).

DESCRIPTION

The present invention refers to new supported components of catalysts for the polymerization of $CH_2=CHR$ olefins wherein R is an alkyl radical with 1 to 4 carbon atoms, or an aryl radical, and mixtures of said olefins with ethylene; and the catalysts obtained from said components.

BACKGROUND OF THE INVENTION

The supported highly active and highly stereospecific catalysts for the polymerization of propylene and higher olefins known up to now are obtained by the reaction of an Al alkyl compound partially complexed with an electron-donor compound (outside donor) with a solid component comprising a Ti compound and an electro-donor compound (inside donor) supported on a Mg dihalide in active form.

Examples of such catalysts have been described in British Patent No. 1,559,194 and Belgian Patent No. 868,682.

Outside donors consisting of silicon compounds containing Si—O—C bonds have been described, also, in published Japanese patent applications Sho 79/94590 and Sho 80/36203.

Among the various and numerous inside donors such compounds as methylmethacrylate and ethyl pivalate have been cited.

However, in all the prior art catalysts in which a silicon compound containing Si—O—C bonds is used as outside donor, esters of benzoic acid and derivatives thereof are used as inside donor.

The performance of the above catalysts, expressed in terms of activity and stereospecificity, is not different from the performance of the catalysts in which ethyl benzoate and similar esters of benzoic acid are used as outside donor.

THE PRESENT INVENTION

One object of this invention is to provide improved catalyst-forming components which result in final catalysts exhibiting increased activity and stereospecificity in the polymerization of α-olefins and in which the inside donor is an ester different from esters of benzoic acid or of derivatives thereof.

This and other objects are achieved by this invention in accordance with which, unexpectedly, it has been found that it is possible to increase the activity and stereospecificity of the prior art supported catalysts comprising, as outside donor, a silicon compound containing Si—O—C bonds, by using as inside donor selected esters having a particular structure.

The catalysts of this invention comprise the product of reaction between the following components:

(a) an Al trialkyl or an Al alkyl compound containing 2 or more aluminum atoms linked to each other through oxygen or nitrogen atoms or through $SO_4$ or $SO_3$ groups;

(b) a silicon compound containing one or more Si—OR, Si—OCOR or Si—$NR_2$ bonds (R being a hydrocarbyl radical);

(c) a solid comprising, as essential support, an anhydrous Mg dihalide present in active form and, supported on said dihalide, a Ti-halide or a ti-haloalcoholate and an electron-donor compound selected from the following groups of compounds:

(1) mono and diesters of aromatic dicarboxylic acids having the COOH groups in ortho position, wherein the R hydrocarbyl radicals of the COOR groups contain less than 3 carbon atoms and at least one of said R radicals contains 2 carbon atoms;

(2) esters of saturated and unsaturated carboxylic acids of formula RCOOR' wherein the R hydrocarbyl radical is either a saturated or unsaturated branched radical containing from 3 to 20 carbon atoms or an arylalkyl radical with 7 to 20 carbon atoms or an aryl radical with 3 to 20 carbon atoms linked to the esteric carbonyl group directly or through a methylene group and in which R' is a hydrocarbyl radical with less than 3 carbon atoms.

Representative compounds, which are also the preferred compounds, are the following: diethylphthalate, methylethylphthalate, diethyl-2,3-naphthalendicarboxylate, methyl and ethyl pivalate, methyl and ethyl methacrylate.

As indicated, the esters of the polycarboxylic acids can contain, beside the ester groups, also unesterified COOH groups.

In preparing components (c) the esters are contacted with the active Mg dihalide, or the precursors of said dihalides as preformed compounds, or the esters can be formed in situ by means of known reactions as, for instance, by esterification between an alcohol or an alcoholate and an aryl halide or between an anhydride or a hemiester of a polycarboxylic acid with an alcohol, or by transesterification. The esters can also be used in mixture with other know inside donors.

The active anhydrous Mg dihalides forming the essential support of component (c) are the Mg dihalides showing in the X-rays powder spectrum of component (c) a broadening of at least 30% of the most intense diffraction line which appears in the powder spectrum of the corresponding dihalide having 1 $m^2/g$ of surface area or are the Mg dihalides showing an X-rays powder spectrum in which said most intense diffraction line is replaced by a halo with the intensity peak shifted with respect to the interplanar distance of the most intense line and/or are the Mg dihalides having a surface area greater than 3 $m^2/g$.

The measurement of the surface area of the Mg dihalides is made on component (c) after treatment with boiling $TiCl_4$ for 2 hours. The found value is considered as surface area of the Mg dihalide.

Very active forms of Mg dihalides are those showing an X-rays powder spectrum in which the most intense diffraction line appearing in the spectrum of the corresponding halide having 1 m²/g or surface area is decreased in relative intensity and broadened to form a halo or are those in which said most intense line is replaced by a halo having its intensity peak shifted with respect to the interplanar distance of the most intense line. Generally, the surface area of the above forms is higher than 30–40 m²/g and is comprised in particular between 100–300 m²/g .

Active forms are also those deriving from the above forms by heat-treatment in inert hydrocarbon solvents and showing, in the X-rays spectrum, sharp diffraction lines in place of the halos.

The sharp, most intense line of these forms shows a broadening of at least 30% with respect to the corresponding line of the Mg dihalide having 1 m²/g of surface area. Preferred Mg dihalides are Mg dichloride and Mg dibromide. The content in water of the dihalides is generally less than 1% by weight.

By Ti halides or Ti haloalcoholates and esters supported on the active Mg dihalide is meant the above compounds which may be chemically or physically fixed on the support, and not extractable from component (c) by treatment of the same with boiling 1,2-dichloroethane for 2 hours.

Components (a), (b) and (c) are made to react with each other in any order; preferably, however, components (a) and (b) are premixed before being contacted with component (c).

Component (c) may be premixed with either component (a) and/or (b). The pre-mixing of (a) and (b) is conducted at temperatures comprised, usually, between room temperature and the temperature used in the polymerization process.

The pre-reaction of (c) and (b) may be carried out also at higher temperatures. Also, compound (b) may be incorporated and made to react with component (c) itself. Component (b) is made to react in a molar ratio with respect to the halogenated Ti compound supported on component (c) of at least 1 and in a molar ratio with respect to the Al alkyl compound used as component (a) of less than 20 and, preferably, comprised between 0.05 and 0.3.

In component (c), the molar ratio between the Mg dihalide and the halogenated Ti compound supported thereon is comprised between 1 and 500 and the molar ratio between said halogenated Ti compound and the electron-donor supported on the Mg dihalide is comprised between 0.1 and 50.

The silicon compounds set forth in (b) include compounds of general formula:

$$R_m SiY_n X_p$$

wherein:

R is an alkyl, alkenyl, aryl, arylalkyl, cycloalkyl radical with from 1 to 20 carbon atoms;

Y is —OR', —OCOR' or —NR'$_2$ wherein R', either equal to or different from R, has the same meaning as R;

X is either a halogen or hydrogen atom or a —OCOR" or —NR$_2$" group wherein R", either equal to or different from R' has the same meaning as R';

m, n and p are numbers comprised respectively between: m between 0 and 3, n between 1 and 4 and p between 0 and 1; and m+n+p is equal to 4.

Other silicon compounds that may be used are compounds in which two or more silicon atoms are bound to each other through oxygen or nitrogen atoms.

Examples of these compounds are hexaethoxydisiloxane, and symmetrical diphenyltetraethoxydisiloxane

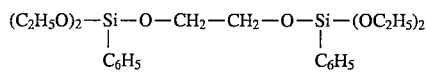

Preferred silicon compounds are: phenylalkoxysilanes, such as phenyltriethoxy or trimethoxysilane, diphenyldimethoxy and diethoxysilane, monochlorophenyldiethoxysilane; alkylalkoxysilanes as, for instance, ethyltriethoxysilane and ethyltriisopropoxysilane.

Examples of other suitable compounds are: chlorotriethoxysilane, acetoxytriethoxysilane, vinyltriethoxysilane, butyltriethoxysilane, triphenylmonoethoxysilane, phenyltricycloethoxysilane, phenyldiethoxydiethylaminosilane, tetraphenoxysilane or tetralkoxysilanes such as tetramethoxysilane.

The silicon compound can also be formed in situ by reaction, for instance, of a halogenated silicon compound such as SiCl$_4$ with an alcohol or an alcoholate of Mg or Al.

In the catalysts of the invention, the silicon compound is present, in a combined form in the solid product of the reaction between the various catalyst forming components, in a molar ratio between the silicon compound and the halogenated Ti compound greater than 0.05 and generally comprised between 0.1 and 5.

The Al alkyl compounds forming component (a) include Al trialkyls as, for instance, Al triethyl, Al triisobutyl, Al triisopropyl, and compounds containing two or more Al atoms linked to each other through hetero-atoms as:

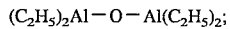

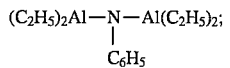

and

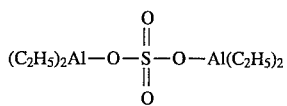

As indicated, Al alkyl compounds in which Al atoms are linked through groups such as SO$_4$ or SO$_3$ are also suitable.

The Al alkyl compounds may be used in mixture with Al alkyl halides, such as AlEt$_2$Cl.

Component (c) is prepared according to known methods. One of these methods consists in co-milling the Mg halide and the electron-donor compound of this invention until the appearance in the X-ray spectrum of the milled product of the modifications set forth above for the spectrum of the Mg dihalide and thereafter reacting the milled product with the Ti compound.

Preparations of this type are described in British Patent No. 1,559,194.

Similar preparations are described in U.S. Pat. Nos. 4,107,413, 4,107,414 and 4,107,415.

Another method consists in reacting the adduct of a Mg halide and an alcohol with a Ti compound in the presence of an electron-donor compound not containing active hydrogen atoms. This method is described in Belgian Patent No. 868,682.

According to another method, which is described in published German patent application No. 3,022,738, the adduct between the Mg dihalide and the alcohol is reacted in liquid form with the halogenated Ti compound and the electron-donor compound.

Further methods are described in published German application No. 2,924,029, U.S. Pat. No. 4,220,554, as well as in Italian patent application No. 27,261/79, the latter being the priority document for the pending U.S. application of Antonio Monte, Ser. No. 206,541, filed Nov. 13, 1980, now U.S. Pat. No. 4,328,122.

Another method consists in co-milling the Mg dihalide, the halogenated Ti compound and the electron-donor compound until the Mg dihalide is activated, and in treating a suspension of the milled product in a halogenated hydrocarbon such as 1,2-dichloroethane, chlorobenzene, methylene chloride, hexachloroethane.

The treatment is carried out at temperatures comprised between 40° C. and the boiling point of the halogenated hydrocarbon for a time ranging, in general, from 1 to 4 hours.

According to another method, a porous support like $SiO_2$ or $Al_2O_3$, having a low content of OH groups (preferably less than 1% by weight), is impregnated with a liquid adduct between the Mg dihalide and an alcohol; the support is then treated with an excess of $TiCl_4$ containing, dissolved therein, the electron-donor compound according to the procedure described, for instance, in published German patent application No. 3,022,738 or Belgian patent No. 868,682.

In all the above methods, the final product contains a Mg dihalide, present in the active form as set forth hereinabove.

Other known methods which lead to the formation of Mg dihalide in active form or to Ti-containing Mg dihalide supported components, in which the dihalide is present in active form, are based on the following reactions:

reaction of a Grignard reagent or a $MgR_2$ compound (R being a hydrocarbyl radical) or complexes of said $MgR_2$ compounds with Al trialkyls, with halogenated agents, such as $AlX_3$ or $AlR_mX_n$ compounds (X is halogen, R is a hydrocarbyl, m+n=3), $SiCl_4$ or $HSiCl_3$;

reaction of a Grignard reagent with a silanol or polysiloxane, $H_2O$ or with an alcohol and further reaction with a halogenating agent or with $TiCl_4$;

reaction of Mg with an alcohol and a halogenhydric acid or of Mg with a hydrocarbyl halide and an alcohol;

reaction of MgO with $Cl_2$ or $AlCl_3$;

reaction of $MgX_2 \cdot nH_2O$ (X=halogen) with a halogenating agent or $TiCl_4$;

reaction of Mg mono- or dialcoholates or Mg carboxylates with a halogenating agent.

The Ti halides and Ti halogenalcoholates include, in particular, the Ti tetrahalides, Ti trihalides and Ti trihalogenalcoholates. Preferred compounds are: $TiCl_4$, $TiBr_4$, 2,6-dimethylphenoxytrichlorotitanium.

The Ti trihalides are obtained according to known methods, for instance by reduction of $TiCl_4$, with Al or an organometallic Al compound or with hydrogen.

In the case of Ti trihalides, it may be convenient, for the purpose of improving the performance of the catalysts, to carry out an oxidization, even if partial, of the titanium, either during or after the preparation of component (c). For this purpose there may be used halogens, iodine halides.

Preferred catalysts are those in which: components (c) is obtained from $MgCl_2$, $TiCl_4$ and diethyl phthalates or methyl or ethyl pivalates, and in which component (b) is phenyl or ethyltriethoxysilane or diphenyldimethoxy or diethoxysilane.

Component (a) is an Al trialkyl such as Al triethyl or Al triisobutyl.

Component (c) is prepared according the methods described in British patent No. 1,559,194, Belgian patent No. 868,682, published German application No. 2,924,029, U.S. Pat. No. 4,220,554, Italian patent application 27,261/79 or published German application 3,022,738.

The preferred method of preparing component (c) includes also the co-milling of $MgCl_2$, $TiCl_4$ and the ester and in treating the milled product with a halogenated hydrocarbon such as a 1,2-dichloroethane.

The catalysts according to the invention are useful for polymerizing the alpha-olefins according to known methods that is, by carrying out the polymerization in a liquid phase, either in the presence or absence of an inert hydrocarbon solvent, or in gas phase or also by combining, for instance, a liquid phase polymerization step with a step in gas phase.

In general the polymerization temperature is comprised between 40° and 160° C., but preferably between 60° and 90° C., operating either at atmospheric or at greater than atmospheric pressure.

As a molecular weight regulator hydrogen or other regulators of a known type are used.

The catalysts are particularly suitable for polymerizing propylene, butene-1, styrene, 4-methylpentene. The catalysts may also be used according to known methods to polymerize mixtures of propylene and ethylene to form modified polypropylenes having better shock-resistance at low temperatures (the so-called block copolymers of propylene and ethylene) or to obtain random crystalline copolymers of propylene containing minor proportions of polymerized ethylene.

The following examples are given for merely illustrative purpose and are not intended to be in any way limiting of the scope of the invention.

EXAMPLES 1–2

Into a stainless stell autoclave having a total volume of 3 l, equipped with a magnetized stirrer and a thermo-couple heat-stabilized at 60° C. and kept under pressure by a nitrogen atmosphere, there were introduced 1,000 ml of a suspension of 5 mols of triethyl aluminum in degassed and anhydrous n-heptane, the phenyltriethoxysilane (PES) and a solid catalytic component prepared according to Example 1 of Italian patent application No. 27,621/79, but using, instead of ethylbenzoate, the esters listed in Table I, while propylene was also fed in. The catalytic components thus prepared showed X-rays powder spectrum in which the most intense diffraction line appearing in the spectrum of $MgCl_2$ having 1 $m^2/g$ of surface area was decreased in relative intensity and broadened to form a halo.

After closing the autoclave, hydrogen was introduced up to a pressure of 0.2 atmospheres, the temperature was brought to 70° C. and, simultaneously, propylene was introduced up to a total pressure of 7 atmospheres.

During the polymerization, the pressure was kept constant by continuous feeding of the monomer. After 4 hours, the polymerization was stopped by quick cooling and degassing of the polymeric slurry. The polymer was separated from the solvent by filtering and was dried in a hot nitrogen flow at 70° C. The quantity of polymer dissolved in the filtrate was thereupon isolated, weighed and summed to the polymer soluble in boiling n-heptane, for calculation of the isotacticity index (I.I.).

The quantity of catalytic component used and the content of Ti in said component, the molar ratio of the phenyltriethoxysilane with respect to the triethylaluminum, the yield in polymer with respect to the introduced catalytic component, the isotacticity index (I.I.), the surface area of the solid catalytic component and the inherent viscosity determined in tetralin at 135° C., are all reported in Table I.

EXAMPLE 3

Example 1 was repeated but using a solid catalytic component prepared as follows:

anhydrous $MgCl_2$, an ester, listed in Table II, and $TiCl_4$ in molar ratio of 1:1 with respect to the ester, was co-ground in a vibrating mill of the type VIBRATOM manufactured by N.V. Tema, s'Gravenhage, Holland, having a total volume of one liter and containing 3 kg of stainless steel balls of 16 mm diameter;

a filling coefficient equal to 100 g/g of total volume (vacuum) was used. The interior temperature of the mill was 25° C., and the grinding time was 72 hours;

charging of the mill, the grinding and discharging of the mill occurred in a nitrogen atmosphere.

10 g of the co-ground product was contacted with 100 ml of 1,2-dichloroethane at 80° C. for 2 hours. After this period, 1,2-dichloroethane was removed by filtration of 80° C. and the residual solid product was repeatedly washed with n-heptane at room temperature until the chlorine ions disappeared from the filtrate and then was kept in suspension in heptane.

The catalytic component thus prepared gave an X-rays powder spectrum in which the most intense diffraction line appearing in the spectrum of $MgCl_2$ having 1 $m^2/g$ of surface area was decreased in relative intensity and broadened to form a halo.

The ester, the characteristics of the solid catalytic components, and the results of the polymerization test are reported in Table I.

EXAMPLE 4

Example 1 was repeated but using a solid catalytic component prepared according to Example 3 of Italian patent application No. 26,908 A/78, which is the priority document for the pending U.S. application of Mario Ferraris et al Ser. No. 226,837 filed Jan. 21, 1981 now U.S. Pat. No. 4,399,054.

A solid adduct $MgCl_2 \cdot 3C_2H_5OH$ in the form of spherical particles was slowly added to a suspension of an adduct $TiCl_4$-ester using molar ratios Mg/ester of 6 and $TiCl_4/C_2H_5OH$ of 12.

The whole was heated at 100° C., kept at said temperature for 2 hours and then filtered at 100° C. The resulting solid product was treated with 110 ml of $TiCl_4$ at 120° C. for 2 hours. After this period, $TiCl_4$ was removed by filtration and the solid was washed with n-heptane at temperatures decreasing from 90° C. to room temperature until the chlorine ion disappeared and then kept in heptanic suspension.

The catalytic component thus prepared gave the same X-rays spectrum as the catalytic component of Example 1.

The ester, the characteristics of the solid catalytic component and the results of the polymerization tests have been reported in Table I.

COMPARATIVE EXAMPLES 1 AND 2

Example 1 was repeated but using the solid catalytic component prepared according to Example 1 of Italian Patent application No. 27,261/79. The X-rays powder spectrum was similar to that of the catalytic component of Example 1.

The results of the polymerization tests are reported in Table I.

COMPARATIVE EXAMPLE 3

Example 4 was repeated but using a solid catalytic component prepared according to Example 3 of Italian patent application No. 26,908 A/78. The X-rays spectrum of that catalytic component was similar to those of Examples 1–2.

The characteristics of the solid product and the results of the polymerization tests are reported in Table I.

TABLE I

| | Solid catalytic component | | | Polymerization | | | | |
|---|---|---|---|---|---|---|---|---|
| Example No. | Ester | $MgCl_2$/ester grinding mols/mols | Ti content of solid component % by weight | $Al(C_2H_5)_3$/PES mols/mols | Catalyst mg | Yield g polymer/g catalyst component | I.I. % | η in h dl/g |
| 1 | diethylphthalate | 14 | 2.3 | 20 | 50 | 7,800 | 93.3 | 1.4 |
| 2 | ethylmethacrylate | 7 | 2.9 | 10 | 47 | 7,000 | 90.7 | 1.3 |
| 3 | ethylbenzoylacetate | 7 | 2.2 | 10 | 43 | 4,900 | 95.4 | 1.2 |
| 4 | monoethylphthalate | 6 | 2.8 | 20 | 26 | 6,000 | 96.9 | 1.3 |
| comp. 1 | ethylbenzoate | 7 | 2.0 | 10 | 46 | 6,000 | 90,6 | 1.4 |
| comp. 2 | ethylbenzoate | 7 | 2.0 | 5 | 47 | 4,000 | 92.7 | 1.6 |
| comp. 3 | ethylbenzoate | | 3.8 | 3 | 45 | 4,500 | 94 | 1.5 |

What is claimed is:

1. A solid catalyst component to be used in combination with an Al alkyl compound and a silicon compound having at least one Si—OR, Si—OCOR, or Si—$NR_2$ bond, to form a catalyst for the polymerization of alpha olefins, said silicon compound being selected from the class consisting of compounds having formula:

$$R_m SiY_n X_p$$

wherein:

R is and alkyl, alkenyl, aryl, arylalkyl, cycloalkyl radical with from 1 to 20 carbon atoms;

Y is —OR', —OCOR' or —$NR'_2$ wherein R', either equal to or different from R, has the same meaning as R;

X is either a halogen or a hydrogen atom or a —OCOR" or —$NR'_2$ group wherein R", either equal to or different from R', has the same meaning as R';

m, n and p are numbers wherein respectively m is between 0 and 3, n is between 1 and 4, p is between 0 or 1; and m+n+p is equal to 4;

wherein said solid catalyst component comprises an anhydrous Mg dihalide in active form, as essential support and, supported on said Mg dihalide, a Ti halide or Ti haloalcoholate and an electron donor compound which is diethylphthalate.

2. A solid component as defined in claim 1, in which the Mg dihalide is Mg dichloride or Mg dibromide and the Ti halide is a Ti tetrahalide.

* * * * *